United States Patent
Abramovich (10) Patent No.: US 9,438,298 B2
(45) Date of Patent: Sep. 6, 2016

(54) FLOATING BASE CHARGER

(71) Applicant: Eyal Abramovich, Tel Aviv (IL)

(72) Inventor: Eyal Abramovich, Tel Aviv (IL)

(73) Assignee: Jeffery Rudes, Los Angeles, CA (US)

( * ) Notice: Subject to any disclaimer, the term of this patent is extended or adjusted under 35 U.S.C. 154(b) by 0 days.

(21) Appl. No.: 14/911,728

(22) PCT Filed: Dec. 17, 2014

(86) PCT No.: PCT/IL2014/051105
§ 371 (c)(1),
(2) Date: Feb. 11, 2016

(87) PCT Pub. No.: WO2015/092793
PCT Pub. Date: Jun. 25, 2015

(65) Prior Publication Data
US 2016/0204816 A1    Jul. 14, 2016

(30) Foreign Application Priority Data

Dec. 17, 2013 (IL) .......................................... 230007

(51) Int. Cl.
*H04M 1/00* (2006.01)
*H04B 1/3888* (2015.01)
*H04B 1/3883* (2015.01)
*H02J 7/00* (2006.01)

(52) U.S. Cl.
CPC .......... *H04B 1/3888* (2013.01); *H04B 1/3883* (2013.01); *H02J 7/0044* (2013.01)

(58) Field of Classification Search
CPC .......... H02J 7/0044; H02J 2007/0062; H02J 7/0027; H02J 7/0068
USPC ......... 455/575.8, 575.1, 572.573, 90.1, 90.2, 455/90.3, 550.1, 556.1, 556.2, 557, 73, 347, 455/422.1, 403, 575.3, 569.1, 569.2; 320/111, 114, 113, 115, 107, 108; D13/107, 108; 379/433.01, 433.08, 379/437, 440, 443, 451

See application file for complete search history.

(56) References Cited

U.S. PATENT DOCUMENTS

| 6,091,611 A * | 7/2000 | Lanni .................... H02J 7/0008 307/151 |
| 2013/0193911 A1* | 8/2013 | Miller ................... H02J 7/0042 320/107 |

* cited by examiner

*Primary Examiner* — Keith Ferguson
(74) *Attorney, Agent, or Firm* — Gentle Winter; Wasserman Law Group (57) ABSTRACT

Charger apparatus for charging a rechargeable device, the charger including a casing, AC pins, a charging circuit and a DC plug, the casing having a slim shape, the AC pins receiving AC voltage from an AC voltage source, the AC pins being rotatably coupled with the casing for rotating from a stowed configuration in which the AC pins conform to the slim shape of the casing, to a charging stance in which the AC pins extend normally posteriorly from the casing, the charging circuit transforming the AC voltage to DC voltage adapted for charging the rechargeable device and providing the DC voltage to a charging port of the rechargeable device, the DC plug moving from a stowed configuration in which the DC plug conforms to the slim shape of the casing, to a charging stance in which the DC plug is exposed from the casing.

10 Claims, 5 Drawing Sheets

FLOATING BASE CHARGER

FIELD OF THE DISCLOSED TECHNIQUE

The disclosed technique relates to electrical chargers in general, and to apparatuses for charging electronic devices while sustaining the charged devices on a floating base of the charger apparatus, in particular.

BACKGROUND OF THE DISCLOSED TECHNIQUE

Many electronic devices include a re-chargeable internal battery which is re-charged via a charger connected to a wall socket or to another external voltage source (i.e., rechargeable electronic device). The rechargeable electronic device further includes an internal charging circuit that, when connected to an external voltage source, charges the internal battery. Chargers are electrical devices which connect to an external voltage source, such as a wall socket, and modify the input voltage to an output voltage which is appropriate for the internal charging circuit of the electronic device being charged. Thus, an electronic device charging apparatus can also be referred to as a power adaptor that merely provides appropriate power to the internal charging circuit of the electronic device being charged. For example, a charger apparatus modifies the input 220V Alternating Current (AC) into 5V Direct Current (DC) voltage appropriate for an electronic device being charged.

Modern electronic devices, which are extensively employed, can consume the battery, and require re-charging every day or maybe even more than once a day. Furthermore, chargers are usually bulky devices exhibiting dimensions typical for power adaptors, which cannot be easily fit into a wallet, for example. Therefore, carrying the charger along during the day can be cumbersome.

In addition, chargers usually connect to the electronic device being charged via a connection line (i.e., cable) ending with a port corresponding to the input charging port of the electronic device being charged. The user of the electronic device places the electronic device on a supporting platform (e.g., a desk or a nightstand) and connects the charger connection line to the electronic device. Therefore, for convenience of the user, the external voltage source should be in the vicinity of such a supporting platform.

Chargers having a compact configuration are known in the art. US Patent application No. 2012/0178506 A1 issued to Sorias et al, entitled "Detachably integrated battery charger for mobile phones and like devices" is directed to battery charger for mobile phones which is detachably attached to a mobile phone with minimal alternation to its size and weight. The battery charger includes a jacket style charger unit, comprised of a back panel and two side panels, and a connector with a male plug. The back panel includes a charging circuit, two AC prongs and a miniature on/off switch. The connector is connected to the charger unit in alignment with the charging socket of the mobile phone. The two AC prongs are attached to the rear of the back panel. The mobile phone to be charged is either slid in between the side panels or snapped into place and consequently connecting the connector to the charging socket of the mobile phone. Each of the AC prongs lie folded down in a shallow trough located at the rear of the back panel, The AC prongs are connected to the back panel via axes that extend longitudinally at their respective bases. The AC prongs are designed to pivot around their axes to an orientation which is perpendicular to the body of the jacket charger. It is noted that the width of the charger of Sorias is at least the width of the charged mobile device, and the charger cannot be folded to decrease its width when it is not being used.

A ChargerCard charger device, as presented at the following webpage http://www.chargecardproject.com/ describes a charger device including a USB port and a mobile phone port. The ChargerCard device connects a mobile device to a USB port for charging or for transferring data. The ChargerCard device has the shape of a flat plastic card.

A dock for charging mobile phones, as presented at the following webpage http://www.quirky.com/products/275-Stow-flatpack-iPhone5-charger describes a charger device which is connected to an AC wall socket for charging the mobile phone. The mobile phone is docked on the charger device while being charged. The detailed dimensions of this charger device are 100×54×15 mm, which are not compact enough to easily fit into a wallet. Additionally, it is noted that this product is not yet produced and therefore its dimensions cannot be verified and might be even larger than those detailed.

SUMMARY OF THE PRESENT DISCLOSED TECHNIQUE

It is an object of the disclosed technique to provide a novel apparatus for charging an electronic device while sustaining the electronic device. The charger apparatus connects to an external voltage source, such as a wall socket, transforms the input voltage into output voltage adapted for charging the electronic device while physically supporting it.

In accordance with an embodiment of the disclosed technique, there is thus provided a charger apparatus for charging a rechargeable device. The charger apparatus includes a casing, AC pins, a charging circuit and a DC plug. The casing has a slim shape. The AC pins receive AC voltage from an AC voltage source. The AC pins are rotatably coupled with the casing. The AC pins rotate from a stowed configuration in which the AC pins conform to the slim shape of the casing, to a charging stance in which the AC pins extend normally posteriorly from the casing. In the stowed stance of the AC pins, the AC pins rest in a respective niche within the casing. The charging circuit transforms the AC voltage to DC voltage adapted for charging the rechargeable device. The DC plug provides the DC voltage to a charging port of the rechargeable device. The DC plug moves from a stowed configuration in which the DC plug conforms to the slim shape of the casing, to a charging stance in which the DC plug is exposed from the casing.

BRIEF DESCRIPTION OF THE DRAWINGS

The disclosed technique will be understood and appreciated more fully from the following detailed description taken in conjunction with the drawings in which:

FIGS. 1A, 1B, 1C, 1 D, 1E and 1F are schematic illustrations of a charger apparatus, constructed and operative in accordance with an embodiment of the disclosed technique;

DETAILED DESCRIPTION OF THE EMBODIMENTS

The disclosed technique overcomes the disadvantages of the prior art by providing a charger apparatus having a charging configuration and a stowed configuration. In the charging configuration, the charger apparatus can be coupled with a rechargeable electronic device for providing appropriate voltage thereto, while sustaining the electronic device (i.e., supporting the weight of the electronic device, and stabilizing it). In the stowed configuration, the charger apparatus is compact and can fit, for example, into a wallet.

In the examples set forth in the following Figures, the charger apparatus has a slim rectangular box shape. It is noted however, that the charger apparatus can take any slim (i.e., flat) form, such as circular, oval, hexagonal and the like. In any of these shapes, the charger apparatus, when in the stowed configuration, is slim enough and is small enough to fit into a pocket or a wallet (i.e., compact charger apparatus). Further in the example set forth in the following description, the rechargeable apparatus is a mobile telephone (i.e., a cellular telephone). It is noted however, that the rechargeable device can be any other rechargeable hand-held electronic device, such as a tablet computer, a media player, a digital book reader, a Personal Digital Assistant (PDA), a digital camera, a shaving machine, and the like. The charger apparatus is also referred to herein below simply as the charger.

Figure 1A:
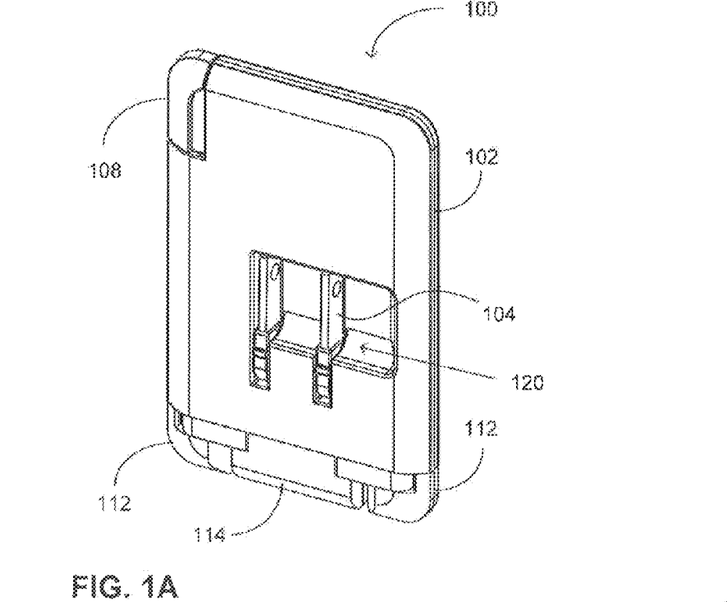
Figure 1B:
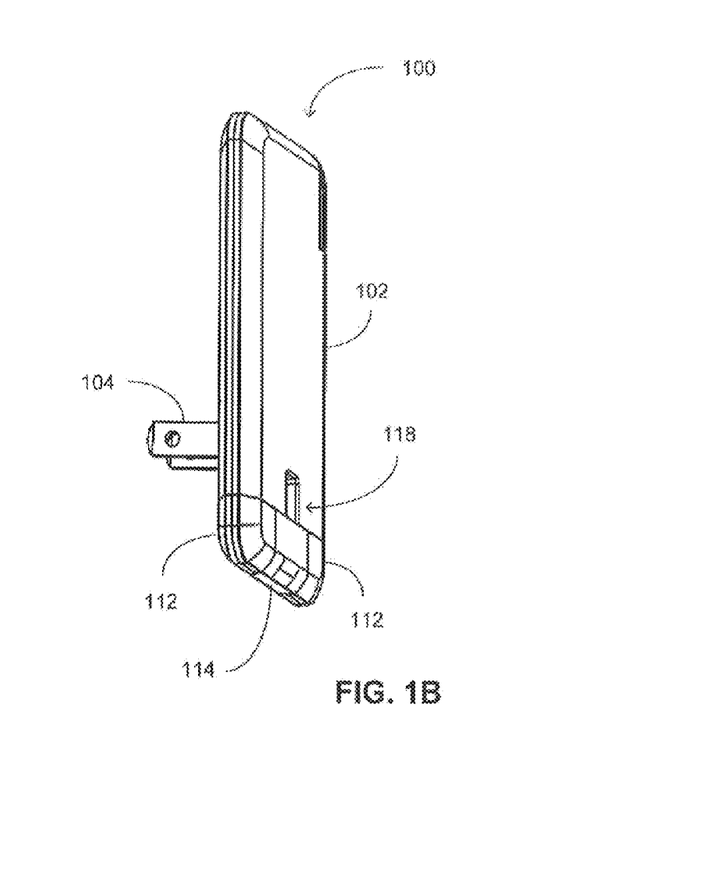
Figure 1C:
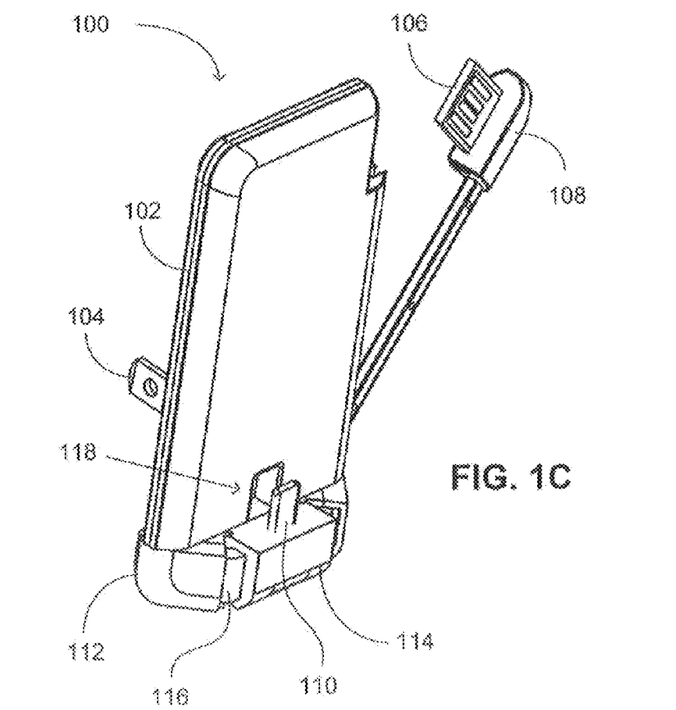
Figure 1D:
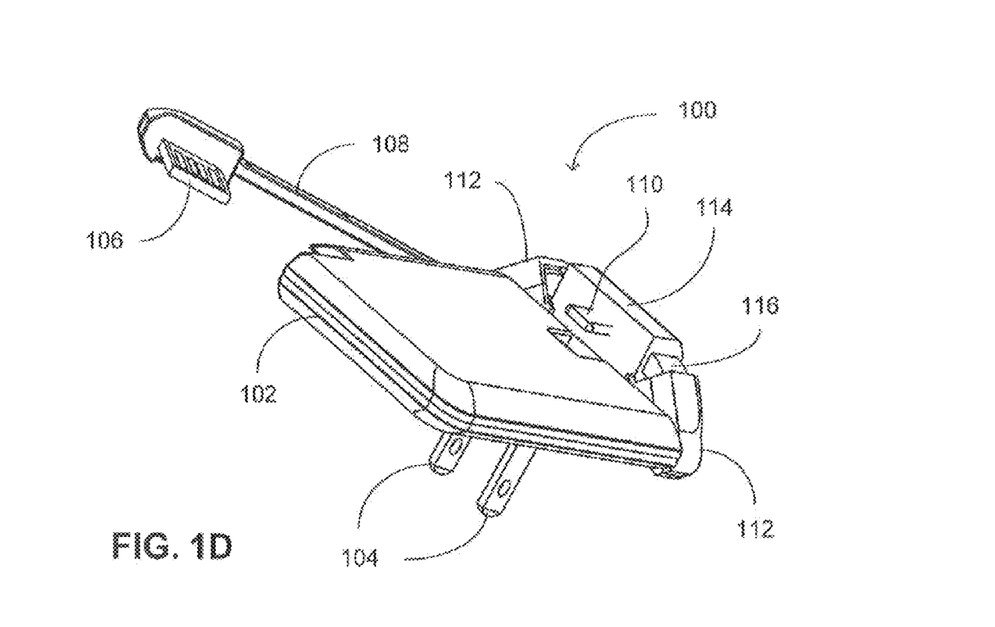
Figure 1E:
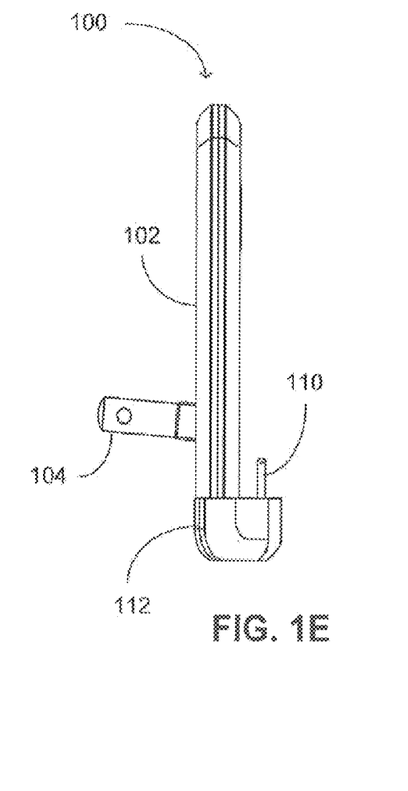
Figure 1F:
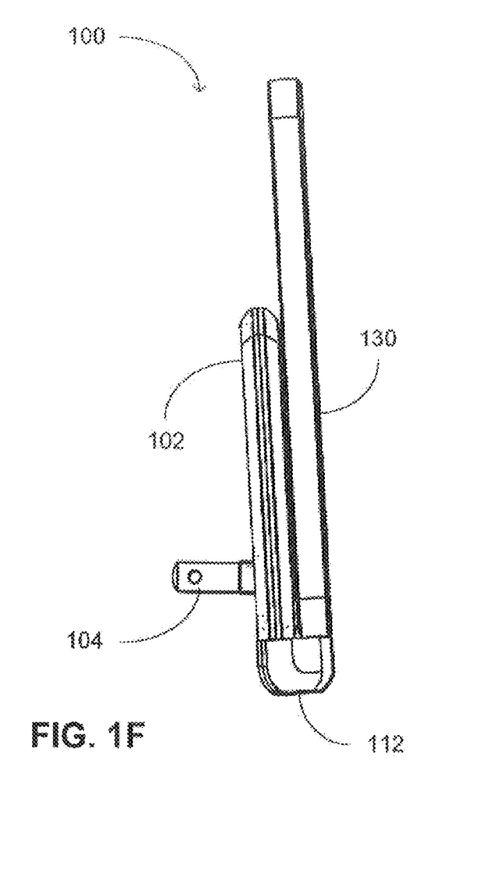

Reference is now made to FIGS. 1A, 1B, 1C, 1D, 1E and 1F, which are schematic illustrations of a charger apparatus, generally referenced 100, constructed and operative in accordance with an embodiment of the disclosed technique. FIG. 1A depicts charger apparatus 100 in the stowed configuration from a back isometric perspective. FIG. 1B depicts charger apparatus 100 in the stowed configuration from a front isometric perspective. FIG. 1C depicts charger apparatus 100 in the charging configuration from a front isometric perspective. FIG. 1D depicts charger apparatus 100 in the charging configuration from a top isometric perspective. FIG. 1E depicts charger apparatus 100 in the charging configuration from a side perspective. FIG. 1F depicts charger apparatus 100 and a rechargeable device mounted thereon from a side perspective.

Charger apparatus 100 includes a casing 102, AC pins 104, USB port 106 (FIG. 1C), USB connector 108, DC plug 110 (FIG. 1C), two rotating bars 112, a plug base bar 114, and two flexible rails 116. Charger apparatus further includes a charging circuit (not shown) encased within casing 102. The charging circuit transforms the incoming AC voltage into DC voltage adapted to a rechargeable mobile device 130 (FIG. 1F). The charging circuit is detailed further herein below with reference to FIGS. 2, 3A and 3B.

In the following paragraphs, the mechanical structure of charger apparatus 100 is detailed. Following would be a description of the electric structure and operation of charger 100, and after that a specific reference to each of FIGS. 1A-1F.

AC pins 104 are conductive pins adapted to fit the holes of an AC socket, and can therefore be slightly different for different countries, depending on the conventional local socket shape (AC pins 104 can be round). AC pins 104 are rotatably coupled with casing 102 and can rotate around a lateral axis (not shown) by 90° from a stowed stance parallel to casing 102 to a charging stance extending normally posteriorly from casing 102 (i.e., extending away from the back surface of casing 102). In the stowed stance (i.e., the stowed configuration of charger 100—e.g., FIG. 1A) AC pins 104 rest within a respective AC pins niche 120. In the charging stance (i.e., the charging configuration of charger 100—e.g., FIG. 1E) pins 104 extend in the posterior direction substantially normally from casing 102 such that they can be inserted into an AC socket of a voltage source (e.g., a wall socket connected to the electricity grid). AC pins 104 are electrically connected via wiring (not shown) with the input of the charging circuit of charger 100.

It is noted that in correspondence with conventional sockets of various countries, pins 104 can be bar shaped, cylindrical or of any shape corresponding to the holes of the AC socket. In the example set forth in FIGS. 1A-1F, AC pins 104 are bar shaped. In accordance with another embodiment of the disclosed technique, each of pins 104 can be further rotated around a longitudinal axis thereof. In this manner, pins 104 can fit sockets in which the holes are slit shaped and are inclined. Additionally in this manner, pins 104 can be moved to a stowed stance in which they are parallel to casing 102, thereby minimizing the dimensions of charger 100 in the stowed configuration, as can be seen for example, in FIG. 2.

It is noted that the wall sockets in some countries include more than two holes. For example, a wall socket includes three holes. In this case, pins 104 include three pins. For instance, the third pin can be a ground pin. Alternatively, the third pin can be a non-conducting key pin, for opening shuttered sockets meant to prevent the insertion of objects other than electric plugs, or to enforce the correct orientation of live and neutral pins. In case of three pins 104, the third pin is rotatably coupled with casing 102 similarly to the other pins 104. The same applies to sockets having four (or even more) holes and respectively requiring four pins.

USB port is a customary USB port as known in the art. USB port 106 is connected at the distal end of a USB connector 108. USB connector 108 is a flexible element which connects USB port 106 to casing 102 both mechanically and electrically. That is, USB connector 108 includes electrical wiring (not shown) running therethrough for connecting USB port 106 to the charging circuit of charger 100. USB connector 108 is made of flexible insulating materials.

Casing 102, rotating bars 112 and base bar 114 are all made of rigid insulating material, such as plastic or other polymeric compounds. Each one of rotating bars 112 is rotatably coupled with an opposite bottom corner (not referenced) of casing 102. Each of rotating bars 112 can rotate around a vertical axis from a stowed stance parallel to casing 102 to a charging stance extending at an acute angle from casing 102. In particular, in the charging configuration rotating bars 112 extend from the front surface of casing 102 (i.e., in the anterior direction). In this manner, a virtual line (not shown) connecting the distal ends of rotating bars 112 to would be positioned anteriorly to the front surface of casing 102. The distal ends of rotating bars 112 are the ends furthest away from the axis by which rotating bars are rotatably coupled with casing 102.

Flexible rails 116 are made of a flexible insulating material. A respective one of flexible rails 116 extends from each of rotating bars 112 toward the opposite one of rotating bars 112. Base bar 114 is slidably mounted on flexible rails 116, and is thereby coupled between rotating bars 112. Specifically, base bar 114 is coupled between the distal ends of rotating bars 112. In the stowed configuration, the distal ends of rotating bars 112 are positioned along the plane of the front surface of casing 102, and base bar 114 is adjacently positioned between rotating bars 112.

Thus, in the stowed configuration (i.e., stowed stance), both rotating bars 112 and base bar 114 conform to the slim shape of casing 102. In the charging configuration, the distal ends of rotating bars are positioned anteriorly to the front surface of casing 102, and thereby, base bar 114 is positioned anteriorly to the front surface of casing 102. Thus, rotating bars 112 move base bar 114 from the stowed stance in which base bar conforms to the shape of casing 102, to the charging stance in which base bar 114 is positioned anteriorly to casing 102.

DC plug 110 is adapted to fit the charging port of rechargeable mobile device 130. In accordance with another embodiment of the disclosed technique, DC plug 110 can be extractable and replaceable by another DC plug adapted to the charging port of another rechargeable device. Thus, charger 100 can charge a variety of rechargeable devices having different charging ports.

DC plug 110 is mounted on plug base bar 114, and in particular, extends vertically from base bar 114. In the stowed configuration of charger 102, base bar 114 is adjacently positioned between rotating bars 112 (FIG. 1B), and DC plug rests within a respective DC plug niche 118. In the charging configuration of charger 100, base bar 114 projects (i.e., to extends anteriorly) beyond the front surface of casing 102, such that DC plug 110 is exposed from niche 118. DC plug 110 is electrically connected with the output of the charging circuit of charger 100 via wiring (not shown) running through rotating bars 112, through flexible rails 116 (or at least one of rails flexible 116), and through base bar 114.

In the charging configuration base bar 114 provides a base for mounting rechargeable device 130 during charging thereof. Rechargeable device 130 is connected to DC plug 110 while being mounted on base bar 114, such that the weight of rechargeable device 130 is supported by base bar 114. In other words, rechargeable device 130 is rested upon base bar 114 during charging, and thereby charger 100 physically supports (i.e., sustains) rechargeable device 130 during charging. Thus, the user can plug charger 100 to the wall socket and mount rechargeable device 130 thereon for charging rechargeable device 130.

When the user tries to pull rechargeable device 130 away from charger 100 after charging is complete, the user should apply the pulling force only in the vertical direction of DC plug 110. In case the pulling force includes other components (i.e., force components in directions other than the vertical direction of plug 110), the pulling might damage DC plug 110, especially after much use. In practice, the user usually pulls rechargeable device 130 from charger 100 without much care, and therefore over time, might damage DC plug 110 and charger 100. For reducing the damage caused by repeated disconnections of rechargeable device 130 from charger 100, base bar 114 is a floating base bar flexibly coupled to casing 102. In particular, base bar 114 is flexibly coupled to charger 102 such that it can align with the pulling direction, thereby reducing the damage to DC plug 110. That is, base bar 114 has at least one degree of freedom for moving with respect to casing when in the charging stance. In the examples set forth in FIGS. 1A-1F, base bar 114 is mounted on flexible rails 116.

For example, flexible rails 116 can be twisted such that base bar 114, and DC plug 110, are tilted at a small pitch angle (i.e., around the lateral axis of charger 100). In this manner, base bar 114 and DC plug 110 align to the direction of the pulling force applied by the user, and rechargeable device 130 is disconnected smoothly and without damaging DC plug 110. The flexibility of rails 116 enables them to twist thereby absorbing the anterior component of the pulling force and protecting DC plug 110.

To sum up the mechanical structure of charger apparatus 100, in the stowed configuration, charger apparatus 100 assumes a slim rectangular box shape. In the charging configuration, AC pins 104 extend normally from the back surface (i.e., in the posterior direction) of charger 102 such that they can be inserted into an AC socket of a voltage source. Additionally, in the charging configuration of charger 100, base bar 114 projects from the front surface of charger 100 such that DC plug 110 is exposed. Thus in the charging configuration, rechargeable device 130 can be connected to DC plug 110 and be mounted on base bar 114, for being charged while being physically supported by charger 100.

In accordance with an alternative embodiment of the disclosed technique, rotating bars 112 can be replaced by other elements which can move from a stowed stance in which they conform to the slim shape of casing 102, to a charging stance in which they extend from opposite corners of casing 102 beyond the front surface of casing 102. For example, rotating bars 112 can be replaced with rotating, or otherwise foldable, arms or rods. Flexible rails 116 can be replaced by other element for connecting the distal ends of rotating bars 112 and for supporting base bar 114 thereon. For example, flexible rails 116 can be replaced with wires, springs, a telescopic rigid rail, a folding rail, and the like. In other words, the function of rotating bars 112 and of flexible rails 116 is to move base bar 114 from a stowed stance in which base bar 114 and DC plug 110 conform to the slim shape of casing 102, to a charging stance in which DC plug 110 is exposed and rechargeable device 130 can be mounted on, and supported by, base bar 114. Additionally, base bar 114 should be allowed some degree of movement (i.e., a floating base bar having at least one degree of freedom when in the charging stance) in order to align with the pulling force applied by the user when disconnecting rechargeable device 130 from charger 100.

In the following paragraphs, the electrical structure and operation of charger 100 is detailed. AC pins 104 receive AC voltage from the AC voltage source (e.g., a wall socket of the electricity grid, a generator, a photovoltaic charger, and the like) and pass the AC voltage via wiring (not shown) toward the charging circuit. The charging circuit receives the AC voltage from pins 104 and converts the AC voltage into DC voltage. In addition the charging circuit transforms the converted DC voltage into a charging voltage adapted to rechargeable mobile device 130. For example, the AC voltage is of 110V, and the rechargeable device accepts voltage of 5V. Charging circuit 104 provides the transformed DC voltage to DC plug 110 which connects with the rechargeable device. Charging circuit can be constructed to receive any AC voltage provided by the wall socket, such as 110V (e.g., as conventional in the USA) and 220V (e.g., as conventional in Europe). The structure of charging circuit is further detailed herein below with reference to FIGS. 2, 3A and 3B. The output voltage produced by the charging circuit is passed to Dc plug 110 for charging rechargeable mobile device 130

USB port 106 can be coupled to an external power source, such as an external battery, or another mobile device (e.g., a laptop computer), for receiving power therefrom for charging rechargeable device 130. Additionally, USB port can be employed as a data connection between rechargeable device 130 and another device. For instance, charger apparatus 100 can be employed for providing data connection between rechargeable mobile device 130 and a laptop computer. Thus, the user of charger 100 should not carry any other cables besides charger 100.

Following are specific references to FIGS. 1A-1F. With reference to FIG. 1A, charger apparatus 100 is depicted in the stowed configuration such that AC pins 104 conform to the slim shape of charger 100. With reference to FIG. 1B, charger 100 is depicted with pins 104 in the charging stance—extending normally in the posterior direction such that they can be inserted into an AC socket. With reference to FIGS. 1C, 1D and 1E, in the charging configuration, base bar 104 projects from the front surface of casing 102 and DC plug 110 is exposed from respective niche 118.

With reference to FIG. 1F, rechargeable device 130 is mounted on base bar 114, and the charging port thereof (not shown) is connected to DC plug 110. Thus, charger apparatus 100 can charge rechargeable device 130 while physically supporting it. It is noted that when AC pins 104 are inserted into a wall AC socket, casing 102 is positioned adjacent and parallel to the wall. Rechargeable device 130 applies a downward force on charger 100 (i.e., gravitational force). The downward force applied by rechargeable device 130 pushes the lower portion of casing 102 (i.e., below pins 104) against the wall. In this manner, the lower portion of casing 102 functions in a similar manner to shelf brackets, thereby relieving some of the downward force applied on pins 104.

In accordance with an alternative embodiment of the disclosed technique, pins 104 can be automatically rotated when the operator moves charger apparatus 100 from the stowed configuration (e.g., FIG. 1A) to the charging configuration (e.g., FIG. 1C), for example, by employing a mechanical pin rotating mechanism (not shown).

In accordance with yet another alternative embodiment of the disclosed technique, charger apparatus 100 can further include a data Modulator-Demodulator (modem) for providing a communication connection to the wall socket and not only power connection. Thus, rechargeable device 130 can be connected to a communication network (e.g., the Internet) via charger apparatus 100.

In accordance with yet a further alternative embodiment of the disclosed technique, charger apparatus 100 further includes an internal power source (e.g., an internal battery—not shown) encased within casing 102. The internal power source enables charger 100 to charge rechargeable device 130 even in case there is no external voltage source. It is noted, however, that such as internal power source can make charger 100 bulkier and heavier.

Figure 2:
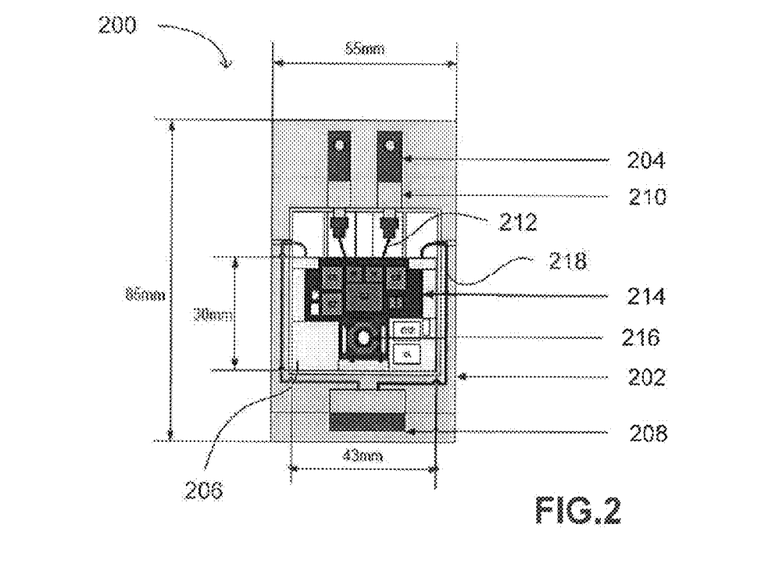
FIG. 2 is a schematic illustration of the electrical system of a charger apparatus, constructed and operative in accordance with another embodiment of the disclosed technique.

Reference is now made to FIG. 2, which is a schematic illustration of the electrical system of a charger apparatus generally referenced 200, constructed and operative in accordance with another embodiment of the disclosed technique. Charger apparatus 200 includes an insulating and supporting casing 202, a pair of AC pins 204, a Switch Mode Power Supply (SM PS) 206, and a DC plug 208. SMPS 206 includes a switching power supply 214 and a power transformer 216. Pins 204 are coated with pin insulating coating 210, exposing only the front end of pins 204 (i.e., exposing the end of the pin that is inserted into the socket). Pins 204 are electrically coupled with SMPS 206 via respective pins wiring 212. SMPS 206 is electrically coupled with DC plug 208 via respective SMPS wiring 218. Pins 204 and DC plug 208 are substantially similar to pins 104 and DC plug 110 of FIGS. 1A-1F.

Casing 202 provides structural support, and electrical insulation, to the electrical systems of charger apparatus 200. Body 202 is made, for example, from polycarbonate. Alternatively, body 202 can be made of any electrically insulating and mechanically robust (i.e., sturdy) material. Pins 204 are for connecting charger apparatus 200 to an AC voltage source (e.g., a wall socket). DC plug 208 is for connecting charger apparatus 200 to the rechargeable device to be charged (rechargeable mobile device 130 of FIG. 3F). SMPS 206 receives the AC voltage from pins 204 and converts it into DC voltage adapted for charging a rechargeable device. That is, SMPS 206 modifies the characteristics of the input power supply to correspond with characteristics of the power supply required for charging the rechargeable device. For example, charger apparatus is connected into a wall socket providing AC power of 220V/50 Hz, and converts the input power into 6V/50 Hz output power adapted for charging the rechargeable device. The structure and operation of SMPS 206 is further elaborated herein below with reference to FIGS. 3A and 3B. It is noted that, the SMPS is also referred to herein as a charging circuit (e.g., the charging circuit of FIGS. 1A-1F).

In the example set forth in FIG. 2, charger apparatus is depicted in the stowed configuration, in which it is folded into a slim rectangular box shape of compact dimensions. For example, the width of charger apparatus 200 is 55 mm, the length is 85 mm, and the depth is 5 mm. It is noted that the depth of the portion of charger apparatus 200 containing SMPS 206 is 6 mm. The size of the portion containing SMPS 206 is 30 mm×43 mm as can be seen in FIG. 2. In particular, the depth of switching power supply 214 is 2 mm, the depth of power transformer 216 is 3 mm, and the depth of body is 1.5 mm from either side of the electrical system. In other words, the portion of casing 102 containing SMPS 206 is bulgier (e.g., depth of 6 mm) than the rest of charger apparatus 100 (e.g., depth of 5 mm) due to the constraints of the electrical components thereof.

In the example set forth in FIG. 2, SMPS 206 is located substantially in the middle of charger apparatus 200. Alternatively, the SMPS can be located anywhere within the charger apparatus as long as the SMPS is electrically connected with the pins on the one hand and with the DC plug on the other hand.

Figure 3A:
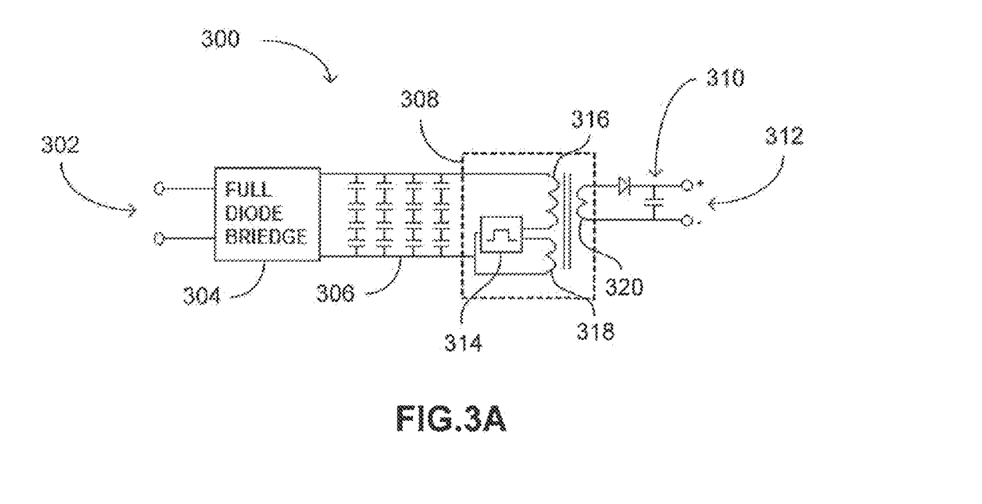
FIG. 3A is a schematic illustration of a Switch Mode Power Supply (SMPS) of a charger apparatus, constructed and operative in accordance with a further embodiment of the disclosed technique.

Reference is now made to FIG. 3A, which is a schematic illustration of a Switch Mode Power Supply (SMPS), generally referenced 300, of a charger apparatus, constructed and operative in accordance with a further embodiment of the disclosed technique. SMPS 300 is the sub-system of a charger apparatus (e.g., charger apparatus 100 and charger apparatus 200 of FIGS. 1A-1F and 2, respectively) which receives the AC power from the external voltage source and converts it into DC power adapted to the charging port of the rechargeable device. The charger apparatus is designed to be compact, and therefore the dimension of SMPS 300 should be as minimal as possible. For example, the depth of SMPS 300 can be as low as 3 mm, and the depth of the insulation frame can be as low as 1.5 mm on either side of SMPS 300. Thereby, the depth of the charger apparatus, at its thickest point is 6 mm.

SMPS 300 includes an input port 302, a diode bridge 304, a capacitors matrix 306, a transformer 308, an output circuit 310 and an output port 312. Transformer 308 includes a Pulse-Width Modulation (PWM) controller 314, a primary coil 316, an auxiliary coil 318 and a secondary coil 320.

Input port 302 is electrically connected to Diode Bridge 304. That is, each of the output terminals of input port 302 is connected to a corresponding input terminal of Diode Bridge 304 (i.e., the terminals are not referenced). Diode Bridge 304 is electrically connected to capacitor matrix 306. Capacitor matrix 306 is electrically connected to transformer 308. In particular, a first terminal of capacitor matrix 306 is connected to a first terminal of primary coil 316. The second terminal of capacitor matrix 306 is bifurcated and is connected to the input of PM controller 314 and to a first terminal of auxiliary coil 318. The output of PAN controller 314 is connected with the second terminal of primary coil 316 and with the second terminal of auxiliary coil 318. Both primary coil 316 and auxiliary coil 318 are inductively coupled with secondary coil 320. Transformer 308 is electrically connected to output circuit 310 (i.e., the output terminals of secondary coil 320 are connected to the input terminals of output circuit 310). Output circuit 310 is electrically connected to output port 312.

Input port 302 receives AC power from the AC pins of the charger apparatus which are connected to a power supply (e.g., AC voltage source, such as a wall socket). For example, input port receives an AC voltage ranging between 50V-310V. Diode bridge 304 (i.e., diode rectifier 304) rectifies the input AC voltage. More specifically, Diode Bridge 304 inverts the "negative" portion of the AC voltage.

Capacitor matrix 306 produces a constant DC voltage from the rippled output of Diode Bridge 304 (i.e., from the rectified voltage). Capacitor matrix 306 is formed of a matrix of capacitors, constructed of several parallel rows, each including several in-series capacitors. Capacitor matrix 306 is designed to replace a single high voltage capacitor, which is relatively thick, with a matrix of thinner capacitors of lower voltages. It is noted that, capacitance is measured in a charge per voltage units (e.g., Coulomb/Volt). Herein below, the voltage of capacitors relates to the voltage range of the capacitor and is not a measure of the capacitance of the capacitor. For example, capacitor matrix 306 includes four parallel rows of four in-series thin 100V capacitors for replacing a single thick 400V capacitor. Thus, by employing a matrix of thin capacitors, the thickness of SMPS 300 is reduced while maintaining high voltage capacitor characteristics (e.g., 400V capacitor).

Transformer 308 receives the constant DC voltage outputted from capacitor matrix 306 and transforms it to lower voltage adapted to the rechargeable device to be charged. For example, transformer 308 receives from capacitor matrix 306 voltage of 70V and provides to output circuit 312 voltage of 6V. As mentioned above, transformer 308 is constructed of PWM controller 314, primary coil 316, auxiliary coil 318 and secondary coil 320. PWM controller 314 controls a high voltage semiconductor switch, such as a Field Effect Transistor (FET) or a bidirectional triode thyristor (e.g., a Triode for Alternating Current-TRIAC), for high frequency power switching transformer 308. PWM controller 314 is powered by auxiliary coil 318. Transformer 308 is a planar transformer, such as a Printed Circuit Board (PCB) transformer. Transformer 308 is thin, and has a total thickness of for example, 3 mm including a 1 mm transformer and 2 mm electromagnetic metal ferrite core. Output circuit 310 includes a diode and a capacitor (both not referenced). The diode converts the low voltage AC provided by transformer 308 into a half DC wave, which the capacitor converts into substantially constant DC voltage output. Output port 312 provides the output DC voltage of SMPS 300 to a DC plug of the charger apparatus for charging the rechargeable device.

Figure 3B:
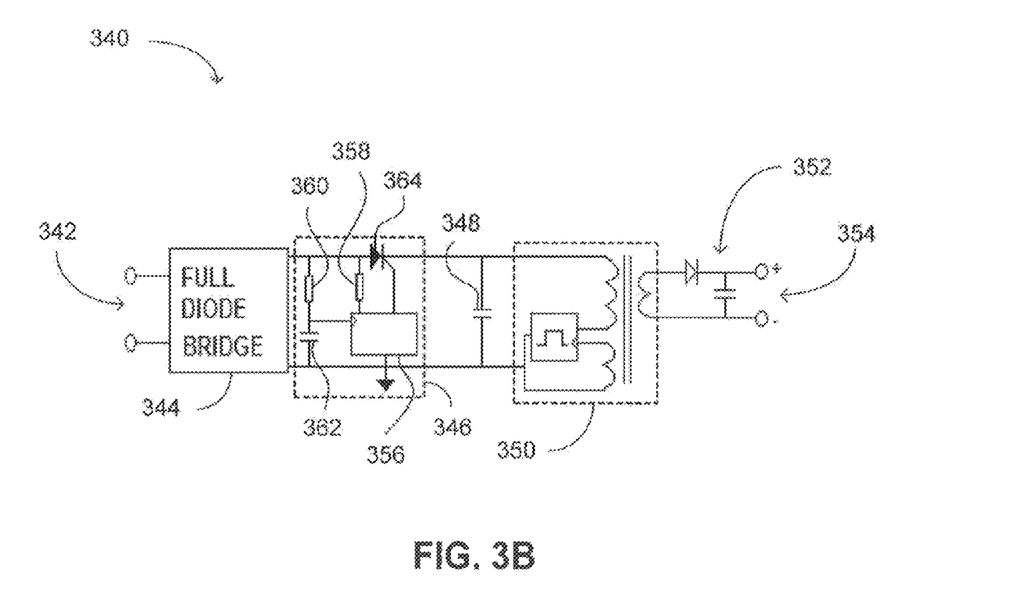
FIG. 3B is a schematic illustration of an alternative design of the Switch Mode Power Supply (SMPS), generally referenced 340, of a charger apparatus, constructed and operative in accordance with yet another embodiment of the disclosed technique.

Reference is now made to FIG. 3B, which is a schematic illustration of an alternative design of the Switch Mode Power Supply (SMPS), generally referenced 340, of a charger apparatus, constructed and operative in accordance with yet another embodiment of the disclosed technique. SMPS 340 is similar to SMPS 300 in FIG. 3A apart from the fact that capacitor matrix 306 (FIG. 3A) is replaced by a Silicon Controlled Rectifier (SCR) coupled with a single capacitor. Thus, the dimensions of SMPS 340 are similar to SMPS 300 (i.e., 6 mm at its thickest point including the insulation casing).

SMPS 340 includes an input port 342, a diode bridge 344, a Silicon Controlled Rectifier circuit (SCR circuit) 346, a main capacitor 348, a transformer 350, an output circuit 352 and an output port 354. SCR circuit 346 includes a microcontroller 356, a sense resistor 358, an SCR supply resistor 360, an SCR supply capacitor 362, and an SCR 364. to Each of Input port 342, Diode Bridge 344, transformer 350, output circuit 352 and output port 354, is substantially similar to each of input port 302, Diode Bridge 304, transformer 308, output circuit 310 and output port 312 of FIG. 3A, respectively.

Input port 342 is electrically connected to Diode Bridge 344. Diode Bridge 344 is electrically connected to SCR circuit 346 which is electrically connected to main capacitor 348. Main capacitor 348 is shunt across the input terminals of transformer 350. Transformer 350 is electrically connected to output circuit 352, which is further connected to output port 354.

In particular, SCR supply resistor 360 and SCR supply capacitor 362 are serially coupled across the output terminals of Diode Bridge 344. A first output terminal of Diode Bridge 344 is bifurcated and is further connected to the input of SCR 364 and to sense resistor 358. The output of SCR 364 is connected to a first output terminal of Diode Bridge 344. A second output terminal of Diode Bridge 344 is connected to a second output terminal of SCR circuit 346. Microcontroller 356 includes terminals connected to sense resistor 358, to SCR 364, and to the ground. Microcontroller 356 further includes a terminal connected between SCR supply resistor 360 and SCR supply capacitor 362.

In SMPS 340, as shown in FIG. 3B, the capacitor matrix 306 of SMPS 300 (FIG. 3A) is replaced by a single main capacitor 348 coupled with SCR circuit 346. SCR circuit 346 reduces the output voltage of diode bridge 344 (e.g., to about 70V). This reduced voltage is fed to main capacitor 348. Due to the fact that the output voltage of the SCR circuit 346 is reduced (i.e., relatively to the output voltage of diode bridge 344), main capacitor 348 may be a small-size off-the-shelf capacitor, with substantially the same voltage range as capacitor matrix 306. The rippled output voltage of Diode Bridge 344, reduced by SCR circuit 346, charges main capacitor 348 which supplies a constant DC voltage to transformer 350.

SCR circuit 346 reduces the output voltage of Diode Bridge 344 by employing microcontroller 356 for controlling the state of SCR 364. Microcontroller 356 switches the on/off states of SCR 364 by sensing the phase of the voltage over sense resistor 358. Microcontroller 356 is activated by a low DC voltage supplied by SCR supply resistor 360 and SCR supply capacitor 362.

Figure 4:
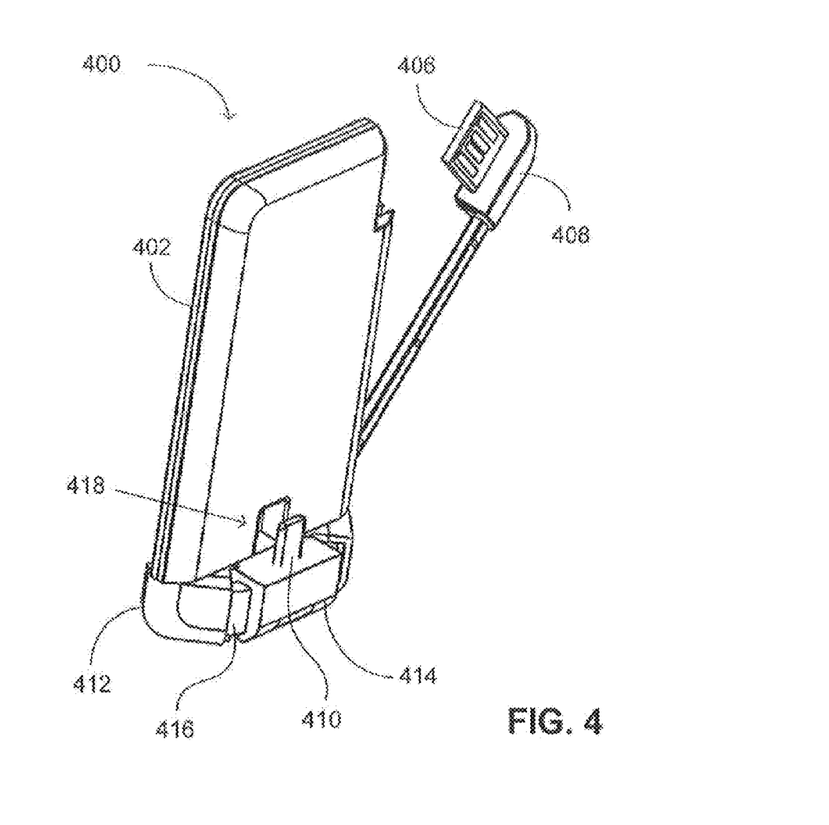
FIG. 4 is a schematic illustration of a charger apparatus, constructed and operative in accordance with yet a further embodiment of the disclosed technique.

As mentioned above, the charger apparatus can include an internal power source for charging the rechargeable device even when there is no access to an external power source. Alternatively, the charger apparatus can include the internal power source and not include components for connecting to an external AC voltage source. Reference is now made to FIG. 4, which is a schematic illustration of a charger apparatus, generally referenced 400, constructed and operative in accordance with yet a further embodiment of the disclosed technique. Charger 400 includes a casing 402, a USB port 106, a USB connector 408, a DC plug 410, two rotating bars 412, a DC plug base bar 414 and two flexible rails 416.

As can be seen in FIG. 4, charger 402 does not include AC pins at all, and therefore cannot connect to an external AC voltage source (but can still be connected to an external power source via USB port 406). Additionally, as there is no connection to an AC voltage source, the charging circuit is also omitted from charger 400. In other words, charger 100 can only charge the rechargeable device from the internal power source of charger 400, and from an external power source via USB port 406.

It will be appreciated by persons skilled in the art that the disclosed technique is not limited to what has been particularly shown and described hereinabove. Rather the scope of the disclosed technique is defined only by the claims, which follow.

The invention claimed is:

1. Charger apparatus for charging a rechargeable device, comprising:
   a casing having a slim shape;
   AC pins for receiving AC voltage from an AC voltage source, said AC pins being rotatably coupled with said casing, said AC pins rotating from a stowed configuration in which said AC pins conform to the slim shape of said casing to a charging stance in which said AC pins extend normally posteriorly from said casing, in said stowed stance of said AC pins said AC pins rest in a respective niche within said casing;
   a charging circuit for transforming said AC voltage to DC voltage adapted for charging said rechargeable device;
   a floating base bar having a DC plug mounted thereon, said DC plug providing said DC voltage to a charging port of said rechargeable device, said floating base bar supporting said rechargeable device during charging, said floating base bar moving from a stowed configuration in which said floating base bar and said DC plug conform to the slim shape of said casing, to a charging stance in which floating said floating base bar projecting beyond said casing such that said DC plug is exposed from said casing, and such that said floating base bar can support said rechargeable device; and
   two flexible rails coupled with said casing, said floating base bar being mounted on said flexible rails, said DC plug being connected to said charging circuit via wiring running through at least one of said flexible rails and through said floating base bar, said flexible rails can be twisted for aligning said base bar to the direction of the pulling force applied by a user when disconnecting said rechargeable device from said charger.

2. The charger apparatus of claim 1, further comprising:
   Two rotating bars rotatably coupled with opposite bottom corners of said casing, said rotating bars rotating from a stowed stance in which said rotating bars conform to the slim shape of said casing, to a charging stance in which said rotating bars are rotated around a vertical axis such that said rotating bars extend anteriorly from said casing, wherein each of said flexible rails extending from a respective one of said rotating bars.

3. The charger apparatus of claim 1, wherein said AC pins are flat pins and are rotatable about a longitudinal axis thereof,
   and wherein in the stowed stance said AC pins are parallel to said casing, and in the charging stance said AC pins correspond to inclined sockets of said AC voltage source.

4. The charger apparatus of claim 1, wherein said charging circuit comprises:
   an input port, for receiving said AC voltage from said AC pins;
   a diode bridge, coupled with said input port, for rectifying said AC voltage into a rectified voltage;
   a capacitors matrix, coupled with said diode bridge, said capacitors matrix comprising at least two parallel columns, each said column comprising at least two in-series capacitors, said capacitors matrix producing a constant DC voltage from said rectified voltage, said capacitors matrix having a voltage range value equal to that of a high voltage capacitor, each capacitor of said capacitors matrix being a low voltage capacitor and having compact dimensions with respect to said high voltage capacitor;
   a transformer, coupled with said capacitors matrix, for transforming said constant DC voltage into a reduced voltage;
   an output circuit, coupled with said transformer, for producing said DC voltage adapted for charging said rechargeable device from said reduced voltage; and
   an output port, coupled with said output circuit, for providing said DC voltage adapted for charging said rechargeable device to said DC plug.

5. The charger apparatus of claim 1, further comprising an internal power source for charging said rechargeable device in case there is no AC voltage source.

6. The charger apparatus of claim 5, wherein said charger excludes said AC pins and said charging circuit and can charge said rechargeable device only from said internal power source.

7. The charger apparatus of claim 1, wherein said DC plug can be replaced by another DC plug adapted to another rechargeable device.

8. The charger apparatus of claim 1, wherein said rechargeable device is selected from the list consisting of
   a cellular telephone;
   a tablet computer;
   a media player;
   a digital book reader;
   a Personal Digital Assistant (PDA);
   a digital camera; and
   a shaving machine.

9. The charger apparatus of claim 1, further comprising a USB port coupled to said casing via a flexible USB connector, said USB port adapted to be connected to an external power source for receiving power for charging said rechargeable device.

10. The charger apparatus of claim 9, wherein said USB port provides data connection between an external device and said rechargeable device.

* * * * *